(12) United States Patent
Yano et al.

(10) Patent No.: US 6,411,345 B1
(45) Date of Patent: Jun. 25, 2002

(54) PLASMA ADDRESSED LIQUID CRYSTAL DISPLAY DEVICE

(75) Inventors: Tomoya Yano, Kanagawa; Masanobu Tanaka, Aiichi; Hidehiko Sekizawa, Kanagawa; Takahiro Togawa, Gifu, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/410,932

(22) Filed: Oct. 4, 1999

(30) Foreign Application Priority Data

Oct. 5, 1998 (JP) ............................................. 10-282992

(51) Int. Cl.[7] ........................... G02F 1/133; G06G 3/28; H01J 17/99
(52) U.S. Cl. ............................. 349/32; 395/60; 313/582
(58) Field of Search ................... 349/32, 139; 345/60, 345/87; 313/582, 589, 586

(56) References Cited

U.S. PATENT DOCUMENTS

| | | | |
|---|---|---|---|
| 5,825,128 A | * 10/1998 | Betsui et al. | 313/485 |
| 5,909,261 A | * 6/1999 | Seki et al. | 313/583 |
| 5,923,389 A | * 7/1999 | Seki | 313/583 |
| 6,075,578 A | * 6/2000 | Hayashi et al. | 313/518 |

* cited by examiner

Primary Examiner—Toan Ton
(74) Attorney, Agent, or Firm—Sonnenschein, Nath, Rosenthal (57) ABSTRACT

A plasma addressed liquid crystal display device has a plurality of plasma channels, each having discharge electrodes for plasma discharge, in an area divided by parallel partitions associated with reference electrodes. The discharge electrodes are formed by a pair of transparent electrodes having pre-set electrode widths and electrode intervals and a bus electrode of a material lower in the electrical resistance than the material of the transparent electrode and which is arranged in association with each transparent electrode. With the present plasma addressed liquid crystal display device, stable display can be obtained in an entire area of the viewing screen.

18 Claims, 8 Drawing Sheets

Prior Art

FIG.1

Prior Art

FIG.2

Prior Art

FIG.3

Prior Art

FIG.4

Prior Art

PLASMA ADDRESSED LIQUID CRYSTAL DISPLAY DEVICE

RELATED APPLICATION DATA

The present application claims priority to Japanese Application No. P10-282992 filed Oct. 5, 1998 which application is incorporated herein by reference to the extent permitted by law.

BACKGROUND OF THE INVENTION

1. Field of the Invention

This invention relates to a plasma addressed liquid crystal display device comprised of an electro-optical display cell, having a layer of an electro-optical material, and a plasma cell, operating as a scanning switch, are layered together with a dielectric sheet in-between.

2. Description of the Related Art

Heretofore, a plasma addressed liquid crystal display device has been proposed, which is comprised of an electro-optical display cell and a plasma cell, layered together with a dielectric sheet in-between.

Figure 1:
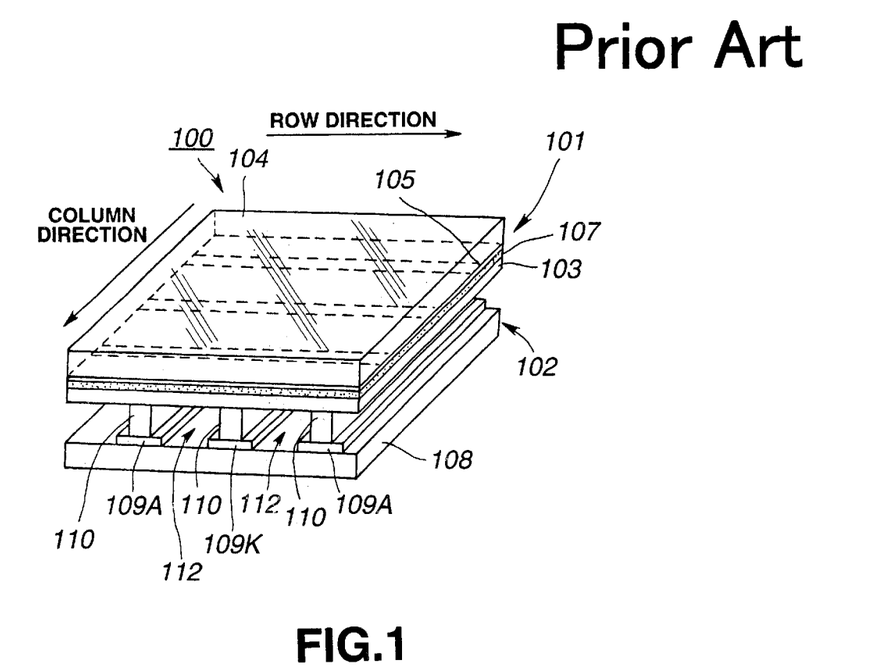
FIG. 1 is a timing chart showing the driving state of a conventional liquid crystal display device.
Figure 2:
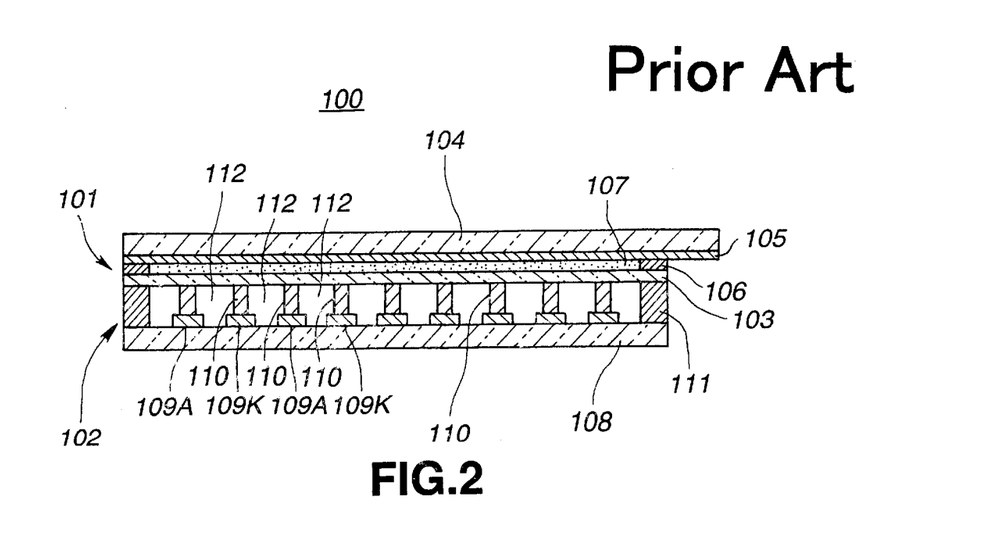
FIG. 2 is a cross-sectional view showing the structure of the conventional liquid crystal display device.

A plasma addressed liquid crystal display device 100 includes a flat panel structure comprised of an electro-optical display cell 101, a plasma cell 102 and an interposed dielectric sheet 103, layered together, as shown in FIGS. 1 and 2. The dielectric sheet 103 is constructed by, for example, a thin glass sheet. For driving the display cell 101, the dielectric sheet 103 needs to be as thin as possible and is formed to a sheet thickness of, for example, 50 $\mu$m.

The display cell 101 is constructed using an upper glass substrate (front side substrate) 104. On an inner major surface of the front side substrate 104, there are plural data electrodes 105 of a transparent electrically conductive material, extending in the horizontal direction and which is layered side-by-side in the row direction (vertical direction). The front side substrate 104 is bonded to the dielectric sheet 103 with a pre-set gap by a spacer. In the gap between the front side substrate 104 and the dielectric sheet 103 is formed a liquid crystal layer 107 by charging a liquid crystal as an electro-optical material. The gap between the front side substrate 104 and the dielectric sheet 103 is of the order of, for example, 4 to 10 $\mu$m, and is kept uniformly over the entire display surface.

The plasma cell 102 is constructed using a lower transparent glass substrate (rear side substrate) 108. On the inner major surface of the front side substrate 104, plural anode electrodes 109A and plural anode electrodes 109K, constituting a plasma electrode, are alternately formed side-by-side in the column direction as a pre-set gap is maintained therebetween. At the mid portions of the upper surfaces of the anode electrodes 109A and anode electrodes 109K are formed barrier ribs 110 of a pre-set with for extending along the electrodes. The upper ends of the barrier ribs 110 are abutted against the lower sides of the dielectric sheet 103 to maintain a constant size of the gap between the rear side substrate 108 and the dielectric sheet 103.

On the rim portions of the rear side substrate 108 is arranged a frit seal material 111 of, for example, a low-melting glass, for extending along the rim portions, for air-tightly bonding the rear side substrate 108 and the dielectric sheet 103. In a gap between the rear side substrate 108 and the dielectric sheet 103 is sealed an ionizable gas.

In the gap between the rear side substrate 108 and the dielectric sheet 103 are arranged plural discharge channels 112 for extending side-by-side along the row direction. The discharge channels 112 are separated from one another by respective partitions 110.

Figure 3:
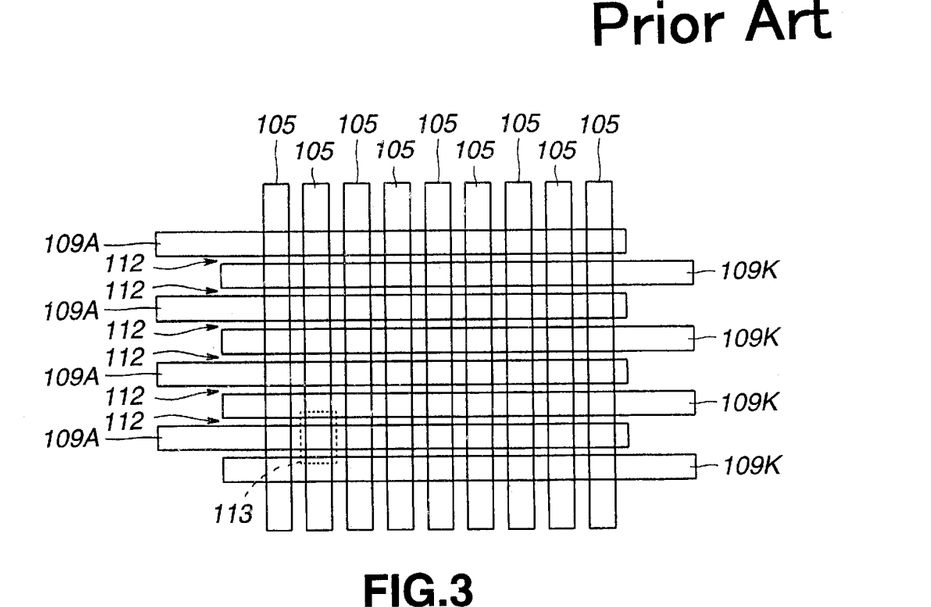
FIG. 3 is a plan view showing an arraying state of data electrodes, plasma electrodes and discharge channels of the conventional liquid crystal display device.

That is, the discharge channels 112 are formed at right angles to the data electrodes 105, which operate as row driving units. The anode electrodes 109A are connected in common and fed with the anode voltage, as will be explained subsequently, so that paired discharge channels 112, disposed on either sides of the cathode electrodes 109K, prove column driving units. At each intersection of the anode and cathode electrodes is defined a pixel 113, as shown in FIG. 3.

If, in the above structure, a pre-set voltage is applied across the anode electrode 109A and the cathode electrode 109K corresponding to the pre-set paired discharge channels 112, the gas in the paired discharge channels 112 is selectively ionized to generate plasma discharge, the inside of which is maintained at an anode potential. If, in this state, the data voltage is sequentially applied to the data electrodes 105, the data voltage is written via dielectric sheet 103 to the liquid crystal layer 107 of the plural pixels 113 arrayed in the row direction in register with the paired discharge channels 112. On completion of the plasma discharge, the discharge channels 112 are at a floating potential, such that the data voltage written in the liquid crystal layer 107 of each pixel 113 is held by the operation of the dielectric sheet 103 until the next writing period, such as after one frame. In this case, the discharge channel 112 operates as a sampling switch, with the liquid crystal layer 107 of each pixel 113 and/or the dielectric sheet 103 operating as sampling capacitors.

Since the liquid crystal operates by the data voltage written in the liquid crystal layer 107 of each pixel 113, display is on the pixel basis. By generating the plasma discharge for sequentially scanning in the column direction the paired discharge channels 112 for writing the data voltage in the liquid crystal layer 107 of plural pixels 113 arrayed in the row direction, it is possible to display a two-dimensional image.

Figure 4:
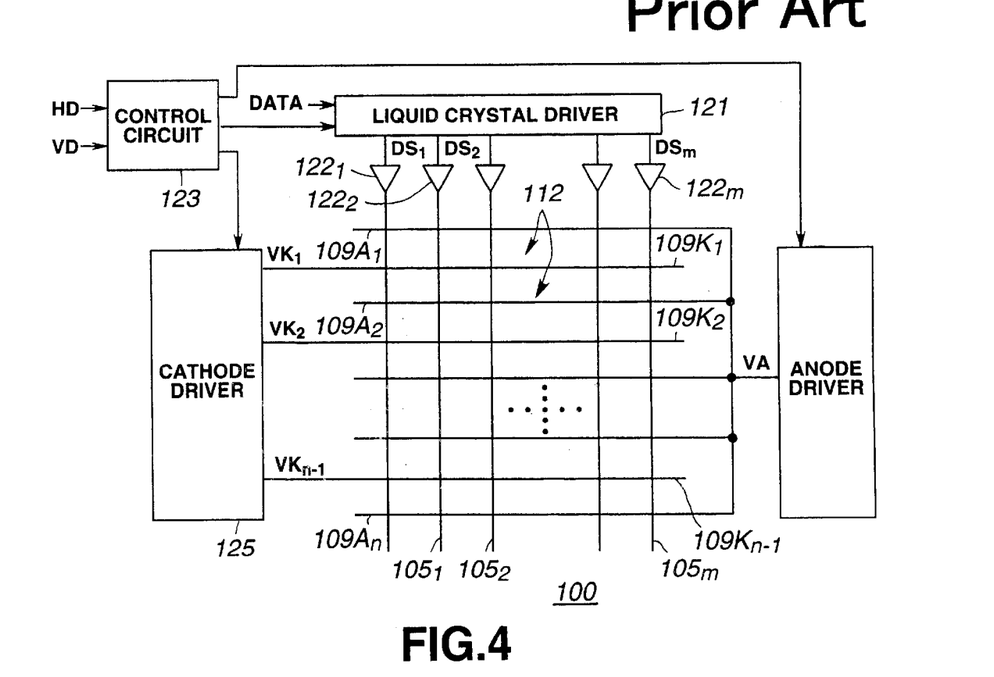
FIG. 4 is a circuit diagram showing a circuit structure of the conventional liquid crystal display device.

FIG. 4 shows a circuit structure of the plasma addressed liquid crystal display device 100. In FIG. 4, the reference numeral 121 is a liquid crystal driver to which video data is supplied. To this liquid crystal driver 121 is supplied video data. From the liquid crystal driver 121, data voltages $DS_1$ to $DS_m$ of plural pixels, constituting a scanning line, are outputted simultaneously every horizontal period. Data voltages $DS_1$ to $DS_m$ of plural pixels constituting the respective lines are outputted from the liquid crystal driver 121 every horizontal period. These plural voltages $DS_1$ to $DS_m$ are routed via respective buffers $122_1$ to $122_m$ to the plural data electrodes $105_1$ to $105_m$.

The operation of the liquid crystal driver 121 is controlled by a control circuit 123, which is fed with horizontal synchronization signals HD and the vertical synchronization signals VD corresponding to video data. The operation of a anode driver 124 and a cathode driver 125, as later explained, is also controlled by this control circuit 123.

To the plural anode electrodes $109A_1$ to $109A_n$, connected in common by the anode driver 124, an anode voltage VA, as a reference voltage, is supplied. To the plural cathode electrodes $109K_1$ to $109K_{n-1}$, cathode voltages $VK_1$ to $VK_{n-1}$, having pre-set potential differences from the anode potential, are supplied by the cathode driver 125 every horizontal period. In this manner, plasma discharge is sequentially produced in the paired discharge channels 112 associated with the cathode electrodes $VK_1$ to $VK_{n-1}$, so that the paired discharge channels 112 for writing the data voltages $DS_1$ to $DS_m$ in the liquid crystal layer 107 of the plural pixels 113 arrayed in the row direction are sequentially scanned in the column direction.

Figure 5A:
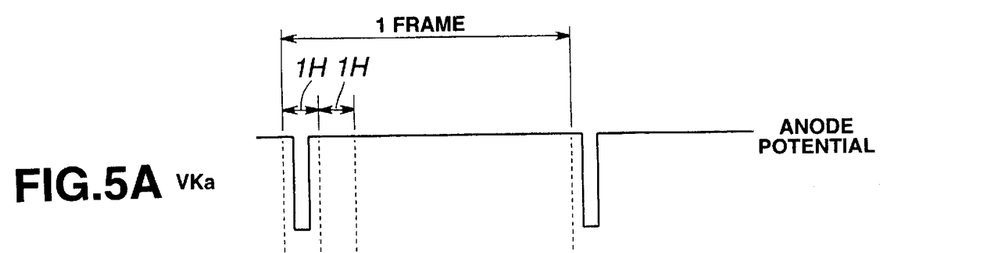
FIGS. 5A to 5D are waveform diagrams showing changes in the cathode voltage of the conventional liquid crystal display device and FIG. 5E is a waveform diagram showing changes in the data voltage.
Figure 5B:
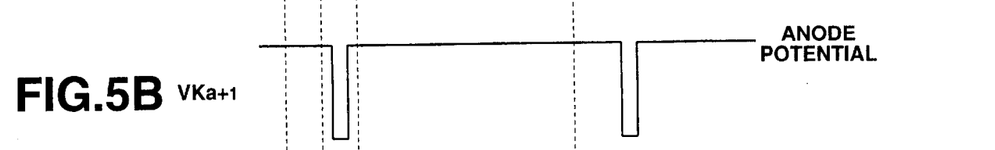
Figure 5C:
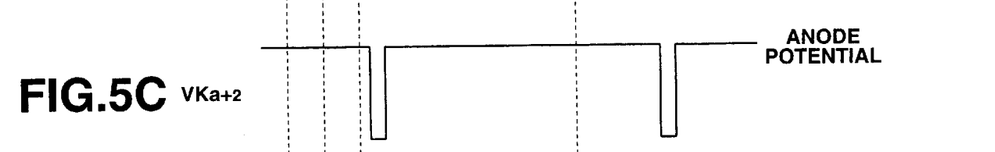
Figure 5D:
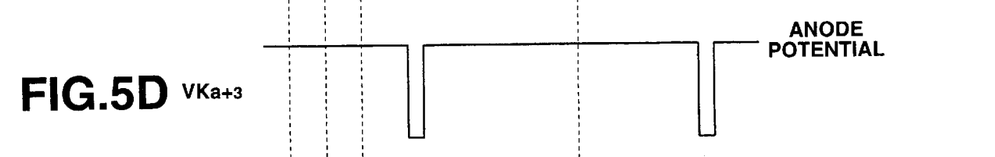
Figure 5E:
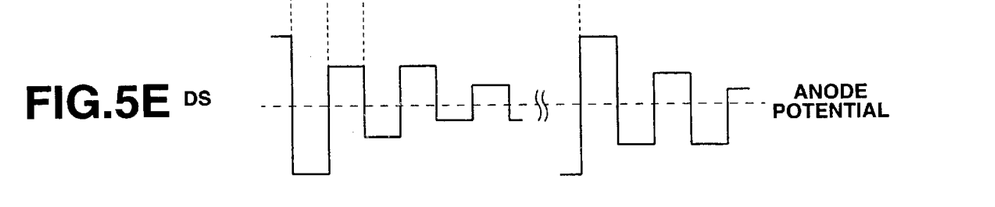

The cathode voltage applied to te cathode electrode 109K and the data voltage DS applied to the data electrode 105 are explained. FIGS. 5A to 5D show the cathode voltages $VK_a$ to $VK_{a+3}$ applied to the cathode electrodes $109K_a$ to $109K_{a+3}$, respectively. FIG. 5E shows the data voltage DS applied to the pre-set data electrode 105. To the cathode electrodes $109K_a$ to $109K_{a+3}$, cathode voltages $VK_a$ to $VK_{a+3}$, lying at pre-set potential differences from the anode potential, are applied during each one horizontal period (1H) on the frame basis. This sequentially scans the discharge channels 112, generating the plasma discharge, in the column direction (in the horizontal direction). The data voltage DS is inverted in polarity with respect to the anode potential every horizontal period and every frame tin order to AC-drive the liquid crystal layer 107. The purpose of the AC-driving of the liquid crystal layer 107 is to prevent deterioration of the liquid crystal.

In the above-described plasma addressed liquid crystal display device 100, the data voltage DS is written by ions and/or electrons, generated by the plasma discharge (DC discharge), charging up the lower surface of the dielectric sheet 103 (surface towards the plasma cell 102 of the dielectric sheet 103). In the case of the plasma addressed liquid crystal display device, in which writing is by the DC discharge, it is a frequent occurrence that uniform discharge current density cannot be obtained on the entire discharge channel, under the effect of surface states of the cathode electrode 109K, fluctuations in structure or the data electrode units, such that stable display cannot be obtained on the entire viewing screen.

For example, in DC discharge, the discharging portion is more liable to discharging by positive feedback, thus producing localized discharge. If the data voltage DS is of the same polarity as the cathode voltage, as the discharging driving voltage, and moreover is of the same polarity as the anode potential (reference potential), the electrical field within the discharging channels becomes weak to suppress discharge.

SUMMARY OF THE INVENTION

It is therefore an object of the present invention to provide a plasma addressed liquid crystal display device whereby stable display can be realized on the entire area of the viewing screen.

In one aspect, the present invention provides a plasma addressed liquid crystal display device having a plurality of plasma channels each having discharge electrodes for plasma discharge, the plasma channels being partitioned by parallel partitions associated with reference electrodes, the discharge electrodes being covered by a plurality of dielectric members, wherein the discharge electrodes are formed by a pair of transparent electrodes having pre-set electrode widths and electrode intervals and a bus electrode formed of a material lower in the electrical resistance than the material of the transparent electrode and which is arranged for extending along the transparent electrode in association with each transparent electrode.

Preferably, the discharge electrodes are arranged so that the bus electrode is positioned towards the partition and the transparent electrode is positioned at a mid portion of the plasma channel. The material of the transparent electrode is ITO. The bus electrode is of a chromium-copper-chromium layered structure. The resistance value of the bus electrode preferably is not larger than 200 Ω/m per line.

If the interval between transparent electrodes is d, the electrode width of the transparent electrode is L and the height of the partition is h, the relation (d+L)<h preferably holds. Also, if the thickness of the dielectric layer is t1, the relation (d+L)>t1 preferably holds.

The reference electrode can be arranged at a mid portion of each partition. The resistance value of the reference electrode preferably is not higher than 200 Ω/m per line. The wiring interconnecting the reference electrodes of the respective channels is formed at a dead zone of a dielectric pattern. Preferably, a contact hole interconnecting the reference electrode and the substrate is also formed at a dead zone of the dielectric pattern.

If the dielectric constant of a dielectric layer is ∈1, the thickness of the dielectric layer is t1, the dielectric constant of the dielectric sheet separating the transparent electrode and the liquid crystal layer from each other is ∈2 and the thickness of the dielectric sheet is t2, the relation (∈1/t1)<5 (∈2/t2) preferably holds.

The pattern of the dielectric layer is partially overlapped with a frit seal pattern. The sealed gas preferably contains not less than 3% of a xenon gas. The sealed gas preferably has a pressure equal to not less than 50 Torr to not higher than 400 Torr at ambient temperature. Preferably, a protective layer is provided on at least a dielectric layer. The protective layer is formed of MgO and has a thickness not less than 0.1 μm and not larger than 5 μm.

With the liquid crystal display device according to the present invention, the plasma addressed liquid crystal display device has a plurality of plasma channels each having discharge electrodes for plasma discharge, the plasma channels being partitioned by parallel partitions associated with reference electrodes, the discharge electrodes being covered by a plurality of dielectric members. The discharge electrodes are formed by a pair of transparent electrodes having pre-set electrode widths and electrode intervals and a bus electrode of a material lower in the electrical resistance than the material of the transparent electrode arranged in association with each transparent electrode. With the present plasma addressed liquid crystal display device, stable display can be obtained in the entire area of the viewing screen.

DESCRIPTION OF THE PREFERRED EMBODIMENTS

Referring to the drawings, preferred embodiments of the present invention will be explained in detail.

Figure 6:
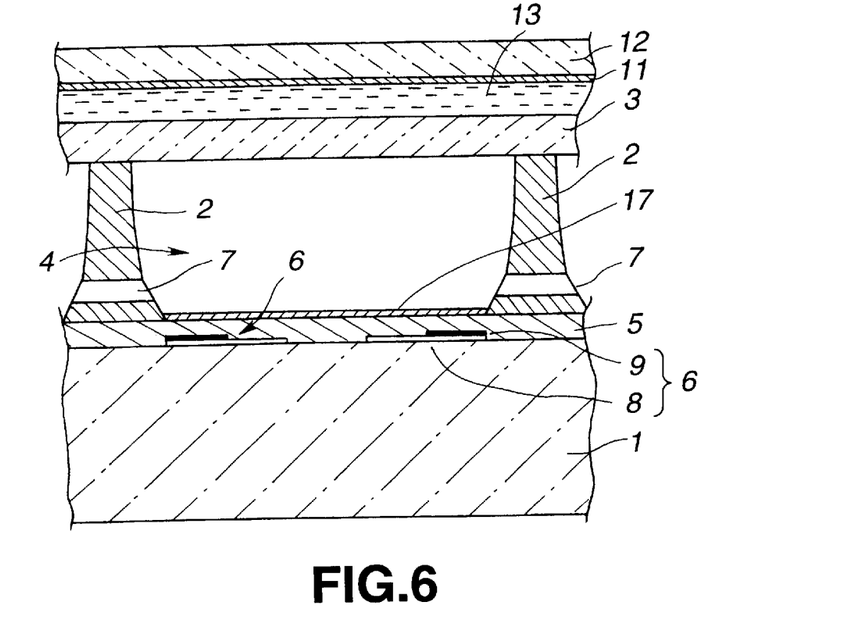
FIG. 6 is a cross-sectional view showing the structure of a liquid crystal display device according to the present invention.

Referring to FIG. 6, the inside of a liquid crystal display device according to the present invention is divided on a rear side substrate 1 by mutually parallel partitions 2, as shown in FIG. 6. The liquid crystal display device also includes plural channels 4 covered by a dielectric sheet 3 supported by the partitions 2 parallel to the rear side substrate 1. The rim portions of the dielectric sheet 3 are sealed to the rear side substrate 1 by a frit seal member 10, as shown in FIGS. 7 and 8, to establish a tightly sealed state between the dielectric sheet 3 and the rear side substrate 1.

Figure 8:
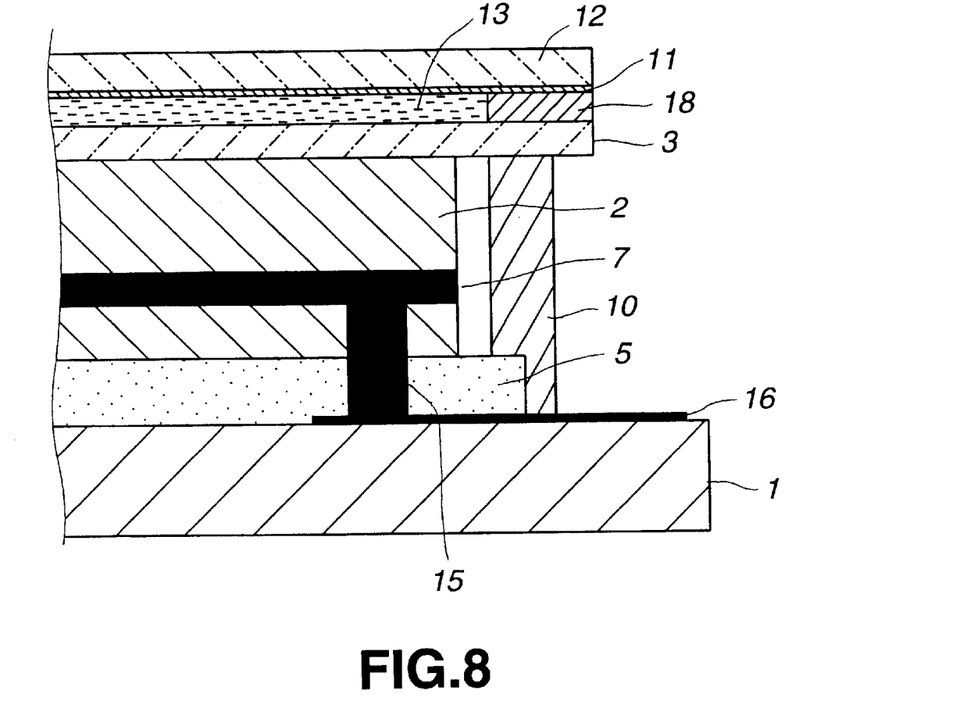
FIG. 8 is a cross-sectional view showing essential portions of the structure of rim portions of the liquid crystal display device according to the present invention.

On the dielectric sheet 3 is mounted a front side substrate 12 provided with a data electrode 11 via a spacer 18, as shown in FIG. 8. The data electrode 11 is formed on the rear surface of the front side substrate 12. The spacer 18 is provided along the rim portions of the front side substrate 12 for encircling the gap between the front side substrate 12 and the dielectric sheet 3. The spacing between the front side substrate 12 and the dielectric sheet 3 is charged with a liquid crystal to form a liquid crystal layer 13.

Figure 7:
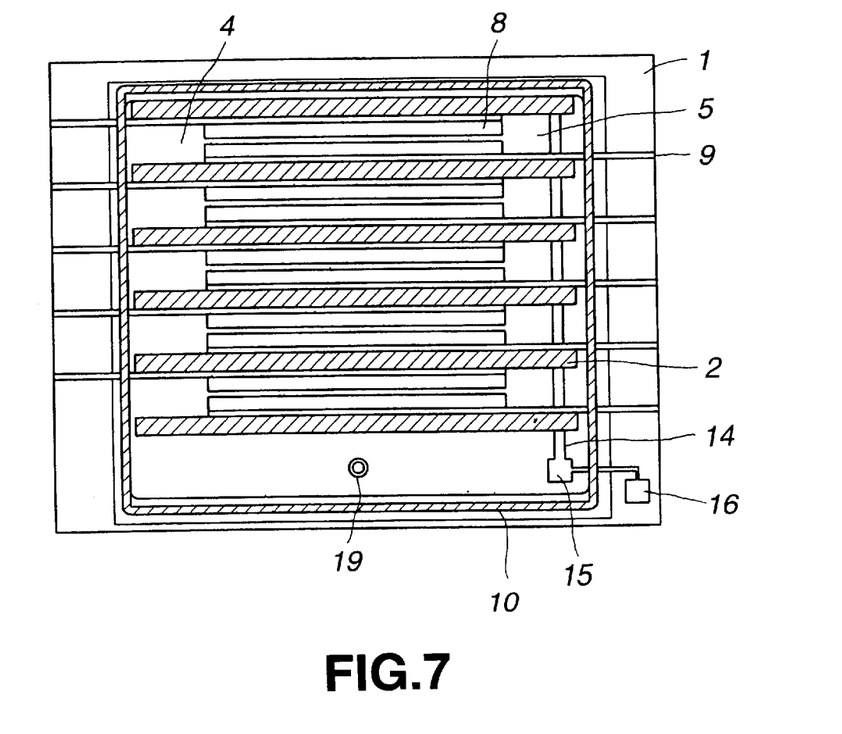
FIG. 7 is front view showing the structure of the liquid crystal display device according to the present invention.

In each channel 4, a pair of discharge electrodes 6 for discharge, covered by a dielectric layer 5, are provided, as shown in FIGS. 6 and 7. In a mid portion of the partition 2, there is provided a reference electrode 7. There are also provided paired discharge electrodes 6 for discharge having a layered structure of a transparent electrode 8 of a wider width and a bus electrode 9 of a narrow width.

The transparent electrode 8 is formed of ITO to a thickness of hundreds of Å. The bus electrode 9 is of a layered structure of chromium-copper-chromium (Cr—Cu—Cr). The chromium layer is hundreds of Å in thickness, with the copper layer being 1 to 2 $\mu$m in thickness.

The electrical resistance value of the discharge electrode 8 may be said to be determined by the thickness of the copper layer. Insofar as discharging characteristics are concerned, a lower electrode resistance of the discharge electrode 8 is desirable. However, the electrode resistance of the discharge electrode 8 is determined by process constraints, that is the copper sputtering process time or the amount of production of the warping of the rear side substrate 1 in case the copper film if an increased thickness.

With increased electrical resistance value of the discharge electrode 8, the time constant determined by the electrode capacity and the electrode resistance is increased. On the other hand, due to the voltage drop by the discharging current, the voltage applied from outside needs to be set to a higher value the remoter a spot under consideration of the discharge electrode 8 is from the electrode contact portion. Therefore, if the electrical resistance of the discharge electrode 8 is higher, fluctuations tend to be produced in the driving voltage. The desirable electrical resistance of the discharge electrode 8 has been empirically found to be 200 $\Omega$/m or less per line.

Since the bus electrode 9 is generally formed of an opaque material, limitations are imposed on the width and the position of the bus electrode 9 from the optical aspect, since the bus electrode 9 leads to a lowered aperture value. In the portion of the partitions 2 and the vicinity thereof, a pre-set voltage is not applied to the liquid crystal layer 13. Therefore, the partition 2 and its vicinity are preferably shielded form light, so that, from optical considerations, the bus electrode 9 is preferably provided at a position capable of shielding the vicinity of the partition from light. That is, in a given channel 4, the bus electrode 9 is provided in the vicinity of the partition 2, while the transparent electrode 8 is provided at a position closer to the center of the channel 4 than the bus electrode 9.

Meanwhile, the electrode interval and the electrode width of the discharge electrode 6 are placed under limitations from discharging characteristics. This is adjusted by the width of the transparent electrode 8 and the interval between the transparent electrode 8.

The dielectric layer 5 needs to be formed of a transparent material for the transmission type liquid crystal mode. The dielectric layer 5, formed of the transparent material, can be formed by a method of screen printing glass paste or by a method of depositing glass powders by an electro-deposition method on the electrode surface.

On the dielectric layer 5 is formed a protective layer 17 which can be formed of MgO to a thickness of 0.1 $\mu$m or more to 5 $\mu$m or less in thickness.

Figure 9:
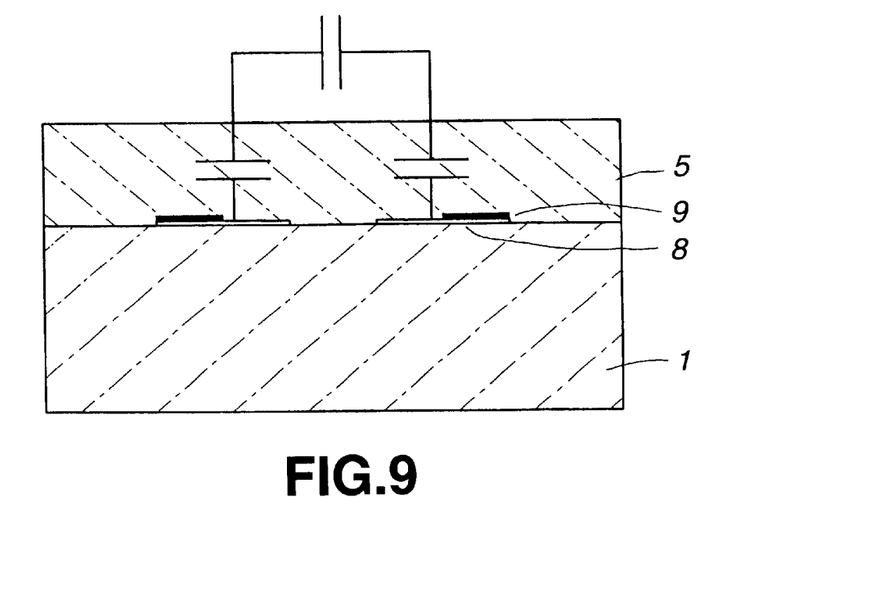
FIG. 9 is an equivalent circuit diagram showing the relation between discharge electrodes in the liquid crystal display device according to the present invention.

The thickness and the dielectric constant of the dielectric layer 5 is placed under limitations concerned with discharging characteristics. The relation between the electrode interval and width of the discharge electrodes 6, thickness of the dielectric layer 5 and the dielectric constant is now explained. In the present liquid crystal display device, a pre-set voltage is applied across paired striped electrodes on a planar surface to produce electrical discharge. Because of the presence of the dielectric layer 5, the gap voltage produced in the discharge space can be equivalently represented by the series capacitance of the capacitance of the dielectric layer 5 and the gap-to-gap capacitance, as shown in FIG. 9. From this equivalent circuit, the capacitance of the dielectric layer 5 is increased to increase the gap voltage with respect to the external driving voltage. Thus, it suffices if the dielectric constant of the dielectric material constituting the dielectric layer 5 is increased, the dielectric layer 5 is reduced in thickness or the interval between the discharge electrodes 6 is increased.

Figure 10:
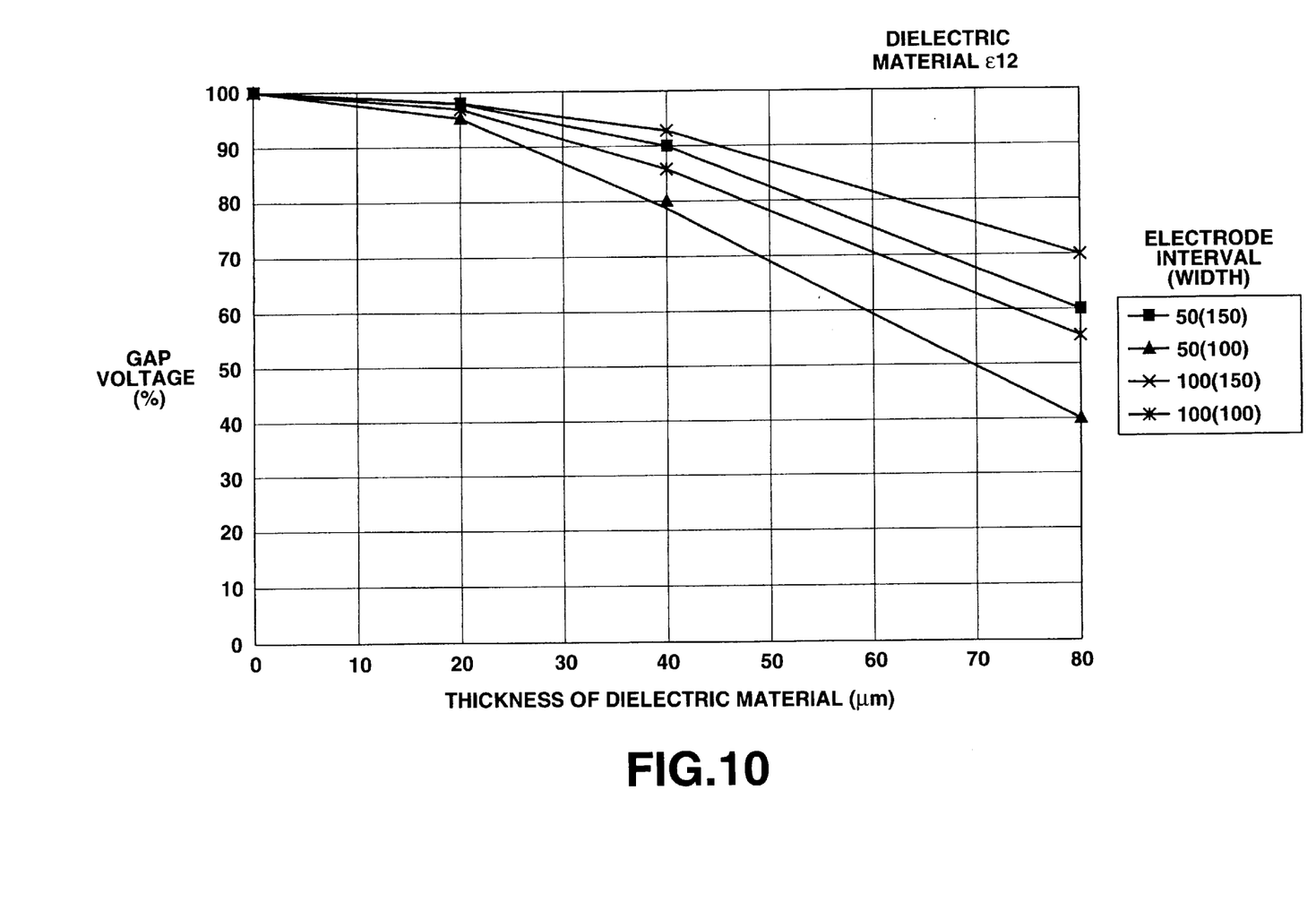
FIG. 10 is a graph showing the relation between the thickness of the dielectric layer in the liquid crystal display device and the gap voltage in the present invention.

In actuality, the discharge electrodes 6 are formed on a planar surface. Therefore, if the gap voltage is estimated by two electrical field simulation, it is seen that, as shown in FIG. 10, a thinner thickness of the dielectric layer 5 is desirable in increasing the gap voltage. In FIG. 10, the abscissa and the ordinate denote the thickness of the dielectric layer 5 and the gap voltage ratio, respectively. The gap voltage is a function of the electrode interval and width of the discharge electrodes 6 and the thickness of the dielectric layer 5. However, with the same thickness of the dielectric layer 5, the gap voltage is increased with the broader electrode width and electrode interval. However, a broader electrode interval cannot necessarily be said to be optimum. That is, in actual panel structures, the width of the sole channel 4 is limited by the partitions 2, 2 on both sides, the widths of the paired discharge electrodes 6 and the electrode interval need to be comprised within this range. Within this limitation, increasing the electrode width of the discharge electrodes 6 and narrowing the electrode interval may serve as means for increasing the gap voltage.

If the electrode width of the discharge electrodes 6 is increased, the electrode capacitance per line is increased, so that, in the driving performance, the rising and decaying waveforms of the discharging pulses are blunted. This blunting in the waveform is determined by the electrode capacitance and resistance of the discharge electrodes 6, wiring resistance and the on-resistance of the driving transistor. In this respect, a lower resistance value of the bus electrode 9 is desirable. The upper limit of the electrode width of the discharge electrodes 6 is determined by the increased electrode capacitance of the discharge electrodes 6, withstand voltage with respect to the electrode of the neighboring channel and the withstand voltage with respect to the reference voltage 7.

The upper limit of the thickness of the dielectric layer 5 is governed by the following factors: That is, since the discharge in the presence of the dielectric layer 5 is the so-called AC discharge, the capacitance of the dielectric layer 5 is charged by the discharge current if the gap voltage exceeds the discharge start voltage to start the electrical discharge. If this charging comes to a close, the discharge automatically comes to a close. That is, the quantity of charges generated by one discharge is determined by the capacitance of the dielectric layer 5. Also, the peak current is determined by the electrode resistance of the discharge electrodes 6, wiring resistance, on-resistance of the driving transistor and by the plasma impedance. If the capacitance of the dielectric layer 5 is larger, the time until charging the discharging current is prolonged, thus necessitating longer time for selecting a line as a plasma switch. Also, since the generated carriers charge the dielectric sheet 3 separating the liquid crystal layer 13 and the dielectric layer 5, the capacitance of the dielectric material is crucial in connection with data writing characteristics. If the amount of electrical charges for electrical charging is increased, the number of residual metastable atoms and hence the number of residual carriers produced therefrom are increased. As plasma switch characteristics, high definition display becomes impossible by the slowing down of the speed until the switch is set to its off state.

In this regard, a smaller capacitance of the dielectric material is desirable. That is, the larger thickness of the dielectric layer 5 and the smaller value of the dielectric constant are preferred. Specifically, with the channel pitch of 500 μm, the combination of the electrode width of the discharge electrodes 6 of 150 μm (width of the bus electrode 9 of 80 μm), electrode interval of 50 μm, dielectric constant of the dielectric layer 5 of 12 and the thickness of the dielectric layer 5 of 30 μm is optimum.

The partition 2 and the reference electrode 7 may be produced by screen printing or sandblasting. Of the materials of the reference electrode 7, exemplified by nickel (Ni), aluminum (Al) or silver (Ag), a low work function as the material of the negative electrode for electrical discharge is not required. However, such a material that can lower the electrical resistance is desirable. The position of the reference electrode 7 is preferably a high position on the partition 2 insofar as discharge characteristics are concerned. However, if the distance from the reference electrode 7 to the liquid crystal layer 13 is shorter, the capacitance between the reference electrode 7 and the column electrode is increased, thus producing the problem of so-called crosstalk. In view of the operation as a discharging switch and for the purpose of lowering the electrode resistance, a broader width of the reference electrode 7 is desirable. However, in view of the crosstalk, it is desirable to increase this width of the reference electrode 7 to approach the reference electrode 7 to the liquid crystal layer 13.

Although the higher height of the partition 2 is desirable in view of the discharging characteristics and the crosstalk, the lower height of the partition 2 is preferred from optical considerations. The reason is that, if the partition 2 of a larger height, the light shielding ratio in case of the increased viewing angle is increased to lower the light utilization efficiently. Although the narrower width of the partition 2 is desirable as to the opening ratio and crosstalk, there is raised the problem of the increased resistance of the reference electrode 7 and difficulty met in manufacturing processes. Specifically, it is preferred that the reference electrode 7 is formed at a position 20 to 30 μm apart from the dielectric layer 5, and that the partition 2 of a height approximately 150 μm is formed thereon. Referring to FIG. 8, this reference electrodes 7 are interconnected at non-valid portions of the dielectric pattern and connected via a contact hole 15 in the dielectric layer 5 to a contact pattern 16 of the rear side substrate 1 to outside.

Thus, in the present liquid crystal display device, if the interval between the transparent electrodes 8 is d, the electrode width of the transparent electrode 8 is L and the height of the partition 2 is h, the relation:

$$(D+L)<h$$

holds.

On the other hand, if the thickness of the dielectric layer 5 is t1, the relation:

$$(d+L)>t1$$

holds.

Furthermore, if the dielectric constant of the dielectric layer 5 is ∈1, the thickness of the dielectric layer 5 is t1 and the dielectric constant of the dielectric sheet 3 separating the transparent electrodes 8 and the liquid crystal layer 13 is ∈2 and the thickness of the dielectric sheet 3 is t2, the following relation:

$$(\in1/t1)<5(\in2/t2)$$

holds.

As gases in the channel 4, rare gases, in general, are used. In the present liquid crystal display device, a large quantity of heavier gases, such as xenon (Xe), is preferably contained in larger quantities. That is, in the present liquid crystal display device, the switching speed is determined by the speed of extinction of metastable atoms. The higher the partial pressure of xenon in a helium (He)—xenon (Xe) mixture, a neon (Ne)—xenon (Xe) mixture or pure xenon, the higher becomes the frequency of collision among particles to promote extinction of metastable atoms to enable transition to the plasma-switch-off state in a shorter time.

However, the total gas pressure is placed under process constraints. That is, after frit sealing the dielectric sheet 3, a firing process, such as orientation film firing, is carried out in the liquid crystal process. The temperature at this time is 200° to 300° Cylindrical lens. During this process, the plasma cell gas pressure is approximately twice the ambient pressure. If the plasma cell inner pressure exceeds the external pressure, the dielectric sheet 3 is destroyed by the inner pressure. With a helium (The)—xenon (Xe) mixture or a neon (Ne)—xenon (Xe) mixture, the driving voltage can be reduced by the so-called penning effect. However, if the xenon ratio is increased, the driving voltage reducing effect is lowered. The xenon ratio and the total pressure are determined taking these into account. Specifically, with pure xenon and the neon (Ne)—xenon (Xe) mixture, the xenon ratio can be set to 3% to 20%, with the total pressure being e.g., 350 Torr.

Figure 11:
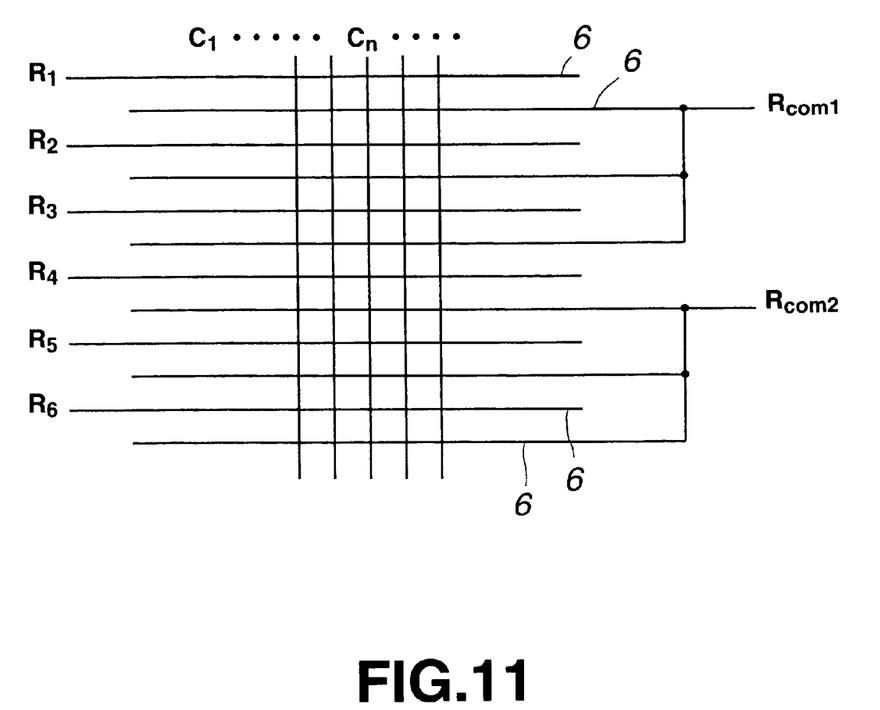
FIG. 11 is a circuit diagram showing the relation of interconnection of the discharge electrodes in the liquid crystal display device according to the present invention.

The method for driving the present liquid crystal display device is now explained. A scan driver for sequentially scanning the channels 4 in the sequence of $_{Rear\ side\ substrate}$ 1, $R_2$, $R_3$, $R_4$, $R_5$, $R_6$, . . . is connected to one of the discharge electrodes 6 of each of the respective channels 4. To the opposite side discharge electrode 6 of each channel 4, a driving pulse is applied simultaneously to plural channels by Rcom1 and Rcom2. Also, a column driver is connected to column electrodes $C_1$, $C_2$, $C_3$, . . . , $C_n$ to apply a voltage corresponding to the data signal, with the potential of the reference electrode 7 as a reference.

Figure 12:
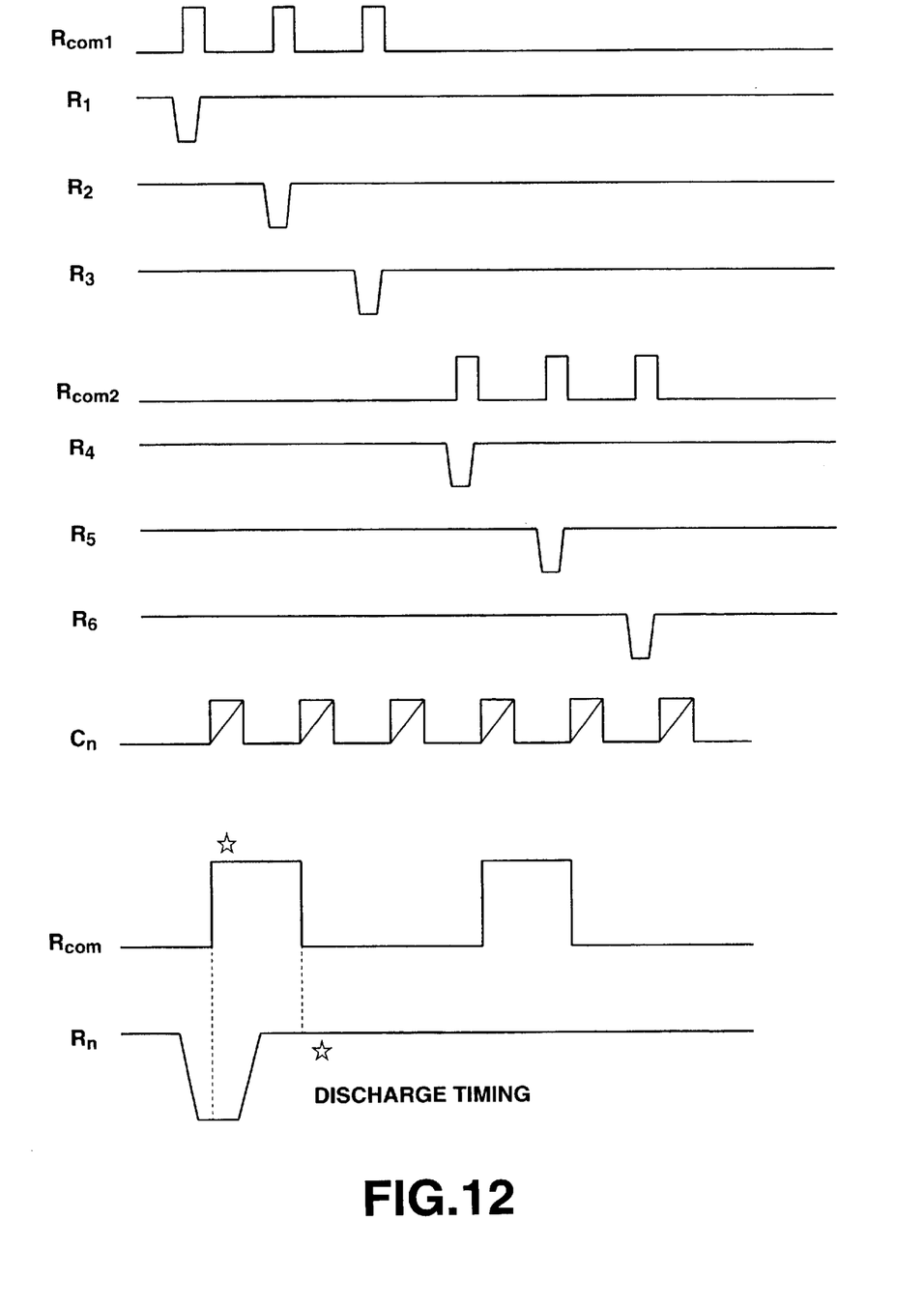
FIG. 12 is a time chart showing the driving state of the liquid crystal display device according to the present invention.

The operation is now explained with reference to the timing chart of FIG. 12. The potential across discharging electrodes is set so as to be lower than the discharging start voltage in the presence only of driving pulses. At the time of selection, pre-set scan pulses are applied by the scan driver on the selection line. At this time, the potential across the discharge electrodes exceeds the discharge start voltage such that the dielectric layer 5 and the dielectric sheet 3 are charged by the discharge current. At the time point of end of charging, the discharge comes to a close automatically. At the respective timings of the rise and decay of the driving pulses during a first selection period, the discharge is started after a delay of 200 ns, and comes to a close in approximately 200 to 500 ns. Since data is written in the dielectric sheet 3 with the potential of the reference electrode 7 as a reference, the electrode resistance of the discharge electrodes 6 is preferably as low as possible so that the potential of the reference electrode 7 or that of the column electrode will not be fluctuated at the time of rising and decay of the applied discharge pulses.

After outputting the scan driver, driving pulses are outputted. The waveform of the driving pulses is desirably as steep sufficiently as possible. Since the discharging delay is on the order of 200 ns, a pre-set potential needs to be set before this delay time. After lapse of pre-set time since the end of the discharging, the scan pulses are switched to the reference potential. This pre-set time depends on the speed of extinction of the metastable atoms. That is, if the extinction of metastable is delayed, residual carriers rewrite the surface charges on the dielectric material at the time point of switching to the reference potential, such that, at a time point of switching of the next driving pulse to the reference potential, a sufficient gap voltage necessary for the second discharging cannot be developed. The pulse width needs to be long so as not to rewrite surface charges. Before generation of the second discharge, a pre-set voltage is outputted to the column electrode side. Similarly to the scan pulse width, the data outputting period is adjusted in meeting with the speed of extinction of metastable atoms.

If all lines are driven simultaneously, a sole driver suffices to output the driving pulses. By the driving pulses being outputted every horizontal period, the liquid crystal layer 13 is modulated responsive to the cross-talk of the pulse voltage, that is to the capacitance coupling component of the plasma electrode and the column electrode. This can be alleviated by splitting the respective lines into plural portions and driving the respective split line potions. Also, plural left and right electrode contact portions can be connected to a sole driver output to effect multiplex driving to reduce the overall number of the driving outputs.

What is claimed is:

1. A plasma addressed liquid crystal display device having a plurality of plasma channels each having discharge electrodes for plasma discharge, said plasma channels being partitioned by parallel partitions associated with reference electrodes, said discharge electrodes being covered by a plurality of dielectric members, wherein said discharge electrodes are formed by a pair of transparent electrodes having pre-set electrode widths and electrode intervals and a bus electrode formed of a material lower in the electrical resistance than the material of the transparent electrode and arranged for extending along the transparent electrode in association with each transparent electrode.

2. The liquid crystal display device according to claim 1 wherein the discharge electrodes are arranged so that the bus electrode is positioned towards the partition and the transparent electrode is positioned at a mid portion of the plasma channel.

3. The liquid crystal display device according to claim 1 wherein the material of the transparent electrode is ITO.

4. The liquid crystal display device according to claim 1 wherein the bus electrode is of a chromium-copper-chromium layered structure.

5. The liquid crystal display device according to claim 1 wherein the resistance value of the bus electrode is not larger than 200 Ω/m per line.

6. The liquid crystal display device according to claim 1 wherein, if the interval between transparent electrodes is d, the electrode width of the transparent electrode is L and the height of the partition is h, the relation (d+L)<h holds.

7. The liquid crystal display device according to claim 1 wherein, if the thickness of the dielectric layer is t1, the relation (d+L)>t1 holds.

8. The liquid crystal display device according to claim 1 wherein the reference electrode is at a mid portion of each partition.

9. The liquid crystal display device according to claim 1 wherein the resistance value of the reference electrode is not higher than 200 Ω/m per line.

10. The liquid crystal display device according to claim 1 wherein the wiring interconnecting the reference electrodes of the respective channels is formed at a dead zone of a dielectric pattern.

11. The liquid crystal display device according to claim 1 wherein a contact hole interconnecting the reference electrode and the substrate is formed at a dead zone of the dielectric pattern.

12. The liquid crystal display device according to claim 1 wherein, if the dielectric constant of a dielectric layer is $\epsilon 1$, the thickness of the dielectric layer is t1, the dielectric constant of the dielectric sheet separating the transparent electrode and the liquid crystal layer from each other is $\epsilon 2$ and the thickness of the dielectric sheet is t2, the relation $(\epsilon 1/t1)<5(\epsilon 2/t2)$ holds.

13. The liquid crystal display device according to claim 1 wherein the pattern of the dielectric layer is partially overlapped with a frit seal pattern.

14. The liquid crystal display device according to claim 1 wherein the sealed gas contains not less than 3% of a xenon gas.

15. The liquid crystal display device according to claim 1 wherein the sealed gas has a pressure equal to not less than 50 Torr to not higher than 400 Torr at ambient temperature.

16. The liquid crystal display device according to claim 1 having a protective layer on at least a dielectric layer.

17. The liquid crystal display device according to claim 16 wherein the protective layer is formed of MgO.

18. The liquid crystal display device according to claim 16 wherein the protective layer has a thickness not less than 0.1 µm and not larger than 5 µm.

* * * * *